United States Patent Office 3,419,898
Patented Dec. 31, 1968

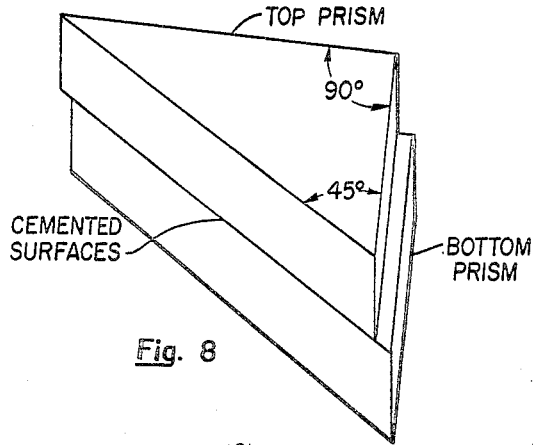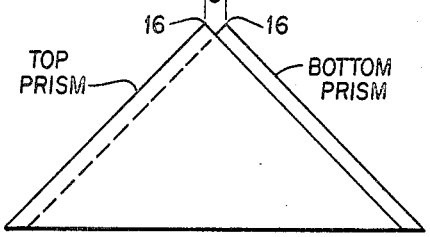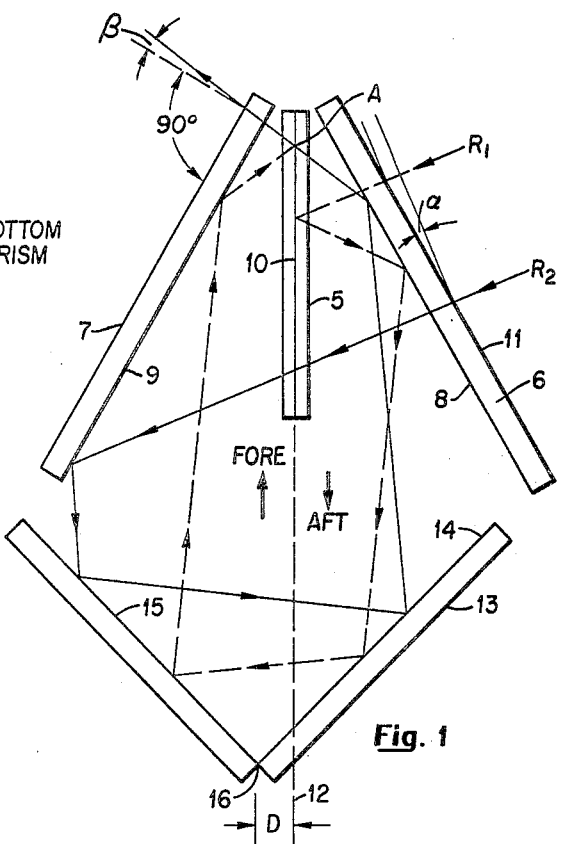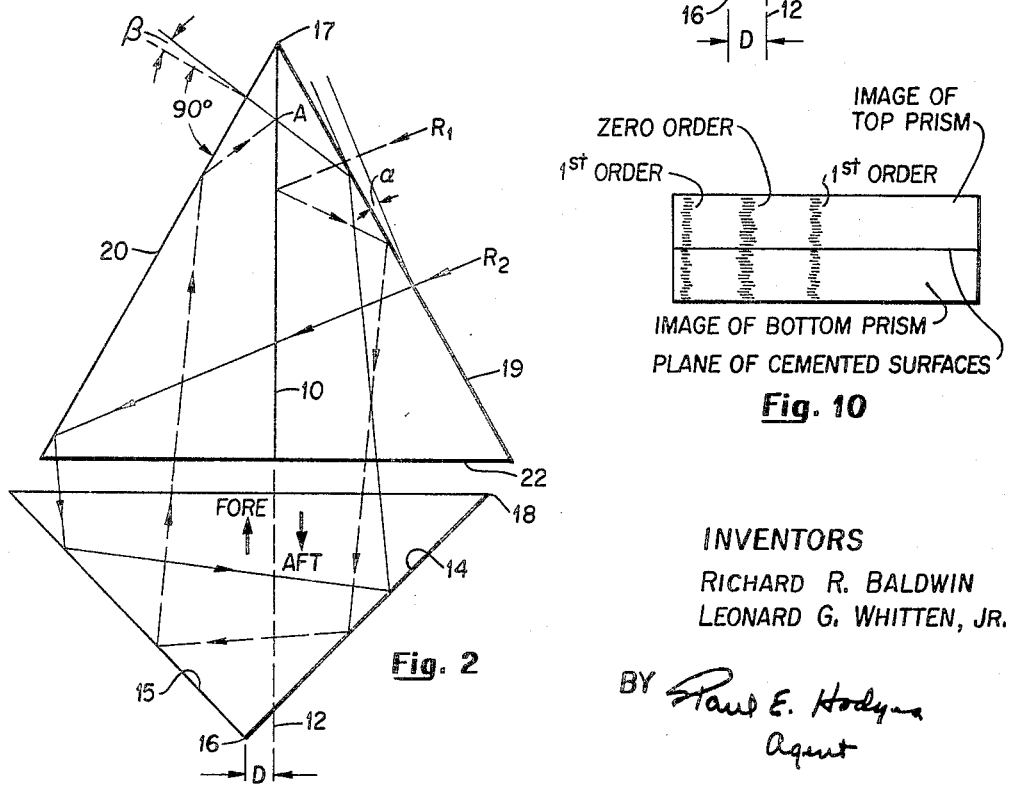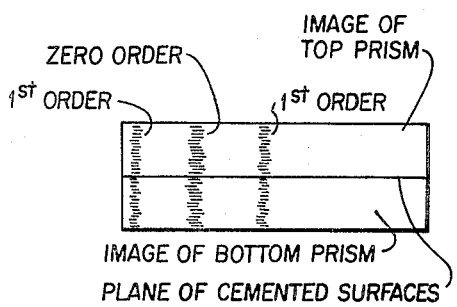

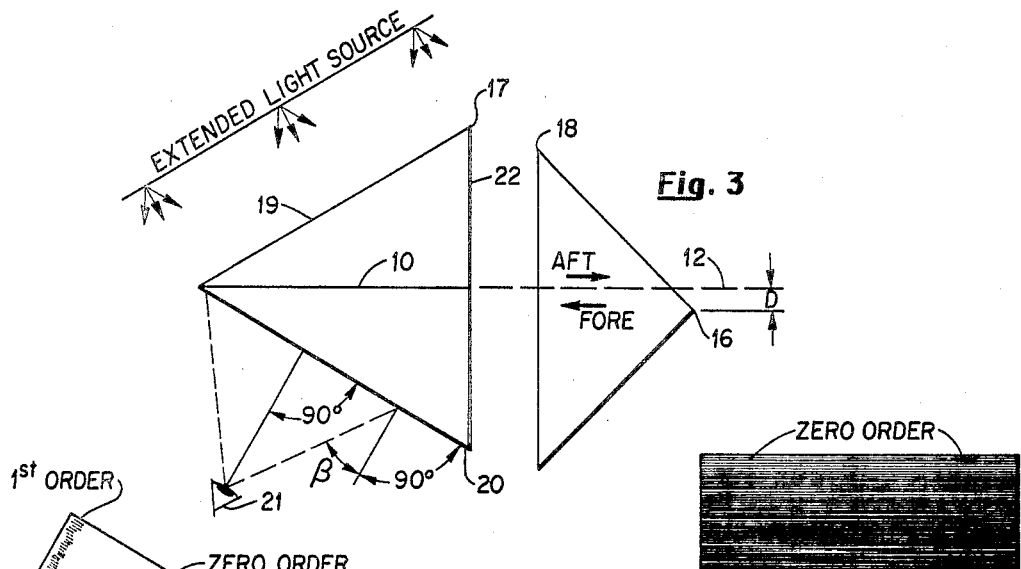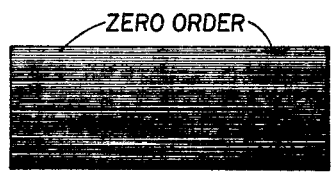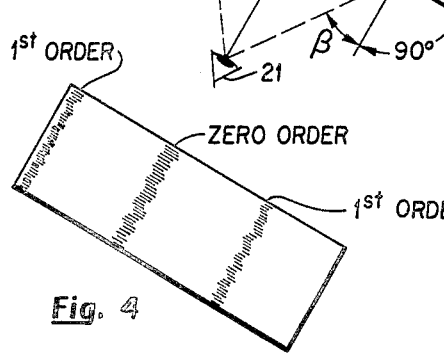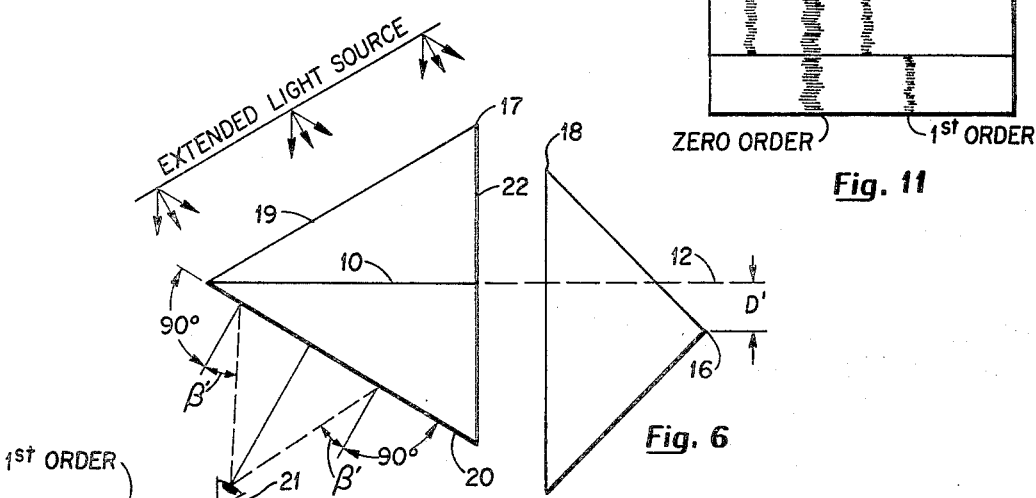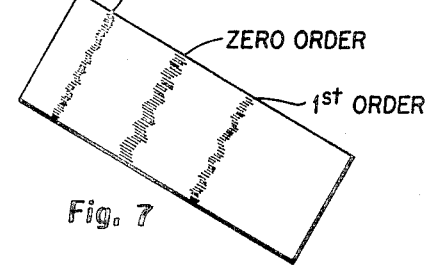

3,419,898
ALIGNMENT INTERFEROMETER
Richard R. Baldwin, 133 Cherokee St., Clinton,
Tenn. 37716 and Leonard G. Whitten, Jr., 105
Edison Lane, Oak Ridge, Tenn. 37830
Filed Mar. 11, 1965, Ser. No. 438,990
10 Claims. (Cl. 356—110)

ABSTRACT OF THE DISCLOSURE

An alignment interferometer including a beam divider, light incident upon the divider and being part reflected and part transmitted thereby, reflectors symmetrically disposed laterally of the divider and reflecting the separate portions of the light along separate non-parallel paths to a retroreflector spaced apart from the divider whereupon the portions of light are retroreflected along separate non-parallel paths to the beam divider to recombine in optical interference. The path of a portion of light returning to the divider is different from, but parallel to, its original path from the beam divider to the retroreflector. Those portions of light which ultimately combine in optical interference comprise the reflected portion of one ray of light and the transmitted portion of a separate ray of light.

This invention relates to optical interferometers and more specifically to an optical interferometer for measuring minute movement of a reflective means in a direction normal to a plane.

It is an object of the present invention to provide an interferometer for measuring distances from a plane in a direction normal to said plane.

It is another object of this invention to provide an interferometer for measuring deviations from a straight line, said deviations being measured in a direction normal to said line.

It is another object of this invention to provide a means for measuring distances or deviations from a plane or line, said distances or deviations being in a direction substantially normal to the path of radiation incident upon a movable retroreflector.

It is another object of this invention to provide an interferometer for measuring distances from a straight line, said distances being measured in a direction normal to said line.

It is another object of this invention to provide an interferometer of increased sensitivity for measuring distances or deviations from a plane, said distances or deviations being measured in a direction normal to said plane and substantially normal to the path of radiation incident upon a retroreflector.

It is another object of this invention to provide an interferometer for detecting and measuring distances or deviations from the projected plane of the beam divider of such interferometer in a direction normal to said plane.

The objects of the present invention are realized by the inventors providing a retroreflector having an axis disposed contiguous to the projected plane of a beam divider, in the paths of separate portions of radiation leaving opposite sides of the beam divider, and reflected in the direction of said retroreflector, to retroreflect said portions to said beam divider to recombine in optical interference. The return paths of said portions are parallel to, but different from, their paths of approach to the retroreflector, the returning portions striking said beam divider at a common position.

Figure 12:
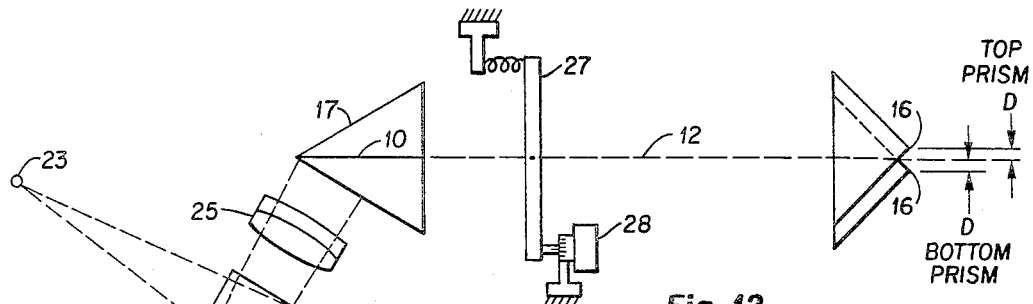
Figure 13:
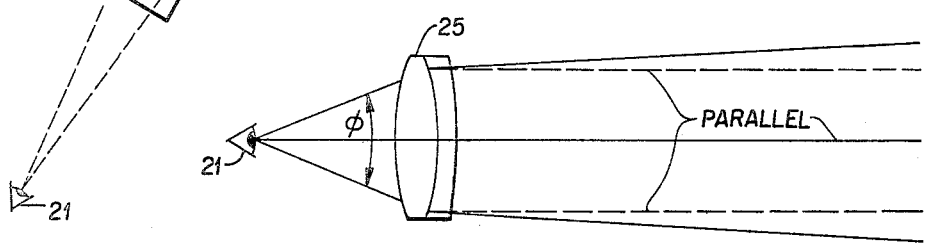
Figure 14:
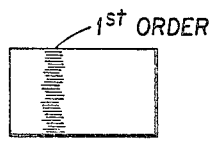
Figure 15:
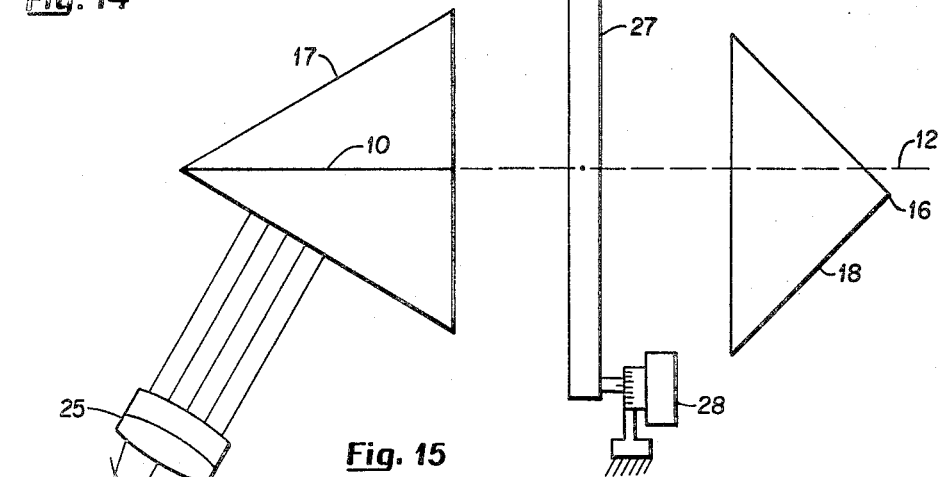

In the figures:

FIG. 1 is a simplified representation of one embodiment of the present invention, FIG. 2 illustrates a further embodiment of the present invention wherein the beam divider is a Kosters prism and the retroreflector is a right angle prism, FIG. 3 illustrates the passage of interfering rays from the beam divider of the subject interferometer to the eye of an observer, FIG. 4 illustrates the typical fringe pattern observable when employing an extended source of white light and further when the joinder axis of the retroreflector is displaced from the projected plane of the beam divider by a small amount as depicted in FIG. 3, FIG. 5 illustrates the observer's view when the displacement of the joinder axis equals zero in the embodiment of FIG. 3, FIG. 6 illustrates the passage of interfering rays from the beam divider to the eye of an observer in the instance of some specific angle beta and some large displacement $D'$, FIG. 7 illustrates the observable fringe pattern in the instance illustrated in FIG. 6, FIG. 8 is a perspective view of a dual retroreflector, FIG. 9 is a top view of the dual retroreflector of FIG. 8, FIG. 10 is an illustration of a typical fringe pattern observable when employing the dual retroreflector of FIG. 8, FIG. 11 depicts the fringe pattern of FIG. 10 but with the 1st order fringes displaced as when the dual retroreflector is moved in a direction normal to the projected plane of the beam divider, FIG. 12 is a schematic representation of one embodiment of the present invention employing a point source of light, the light being incompletely collimated prior to entering the Kosters prism, and a dual retroreflector, FIG. 13 illustrates the effect of a lens on slightly converging light rays passing therethrough and to the eye of an observer, FIG. 14 illustrates the fringe pattern observable by use of the system of FIG. 12 when the system is so adjusted as to exclude all fringes except a single 1st order fringe, and, FIG. 15 depicts an embodiment of the present invention employing fully collimated light and a photodetector.

Referring now to the figures, a simplified embodiment of the present invention may be seen in FIG. 1. A beam divider comprising two optically flat plates, their flat sides cemented together and one of the joined sides being semi-silvered to create a beam dividing surface 10, is flanked on either side by fixed transparent (glass) plates 6 and 7 having reflective surfaces 8 and 9 which may be, but need not be, provided with a partially reflective medium. Plates 6 and 7 are disposed in separate planes at an angle with respect to each other. Preferably this angle is 60°. Beam divider 5 lies in the plane bisecting the angle formed by plates 6 and 7. Beam divider 5 may properly also be termed a partial reflector.

FIG. 1 depicts two isogenus, parallel rays $R_1$ and $R_2$ incident upon plate 6. $R_1$ and $R_2$ may, for example, be produced by collimating white light. As shown in FIG. 1, the two rays $R_1$ and $R_2$ are selected to approach plate 6 from an angle as distinguished from a direction normal to plate 6. It is recognized in the art that a ray of light striking a partially reflective surface such as the surface of a transparent glass plate an angle other than normal thereto will be in part reflected. Generally the greater the angle varies from the normal to the surface, the more reflection there is occurring. Those portions of $R_1$ and $R_2$ reflected by surface 11 of plate 6 are ignored for the purposes of this invention.

Because the parallel rays $R_1$ and $R_2$ are isogenus and strike plate 6 at an angle other than 90°, their paths of travel from their source to plate 6 are different in length. The angle formed by the exterior surface 11 of plate 6 and an imaginary line originating at a point on $R_1$ and extending normally therefrom to the point of intersection of $R_2$ and surface 11 is designated angle alpha ($\alpha$).

Rays $R_1$ and $R_2$ pass through plate 6 and strike beam divider 5, whereupon $R_1$ and $R_2$ are part reflected and part transmitted at the beam dividing surface 10 thereof. The reflected portion of $R_1$ strikes surface 8 of plate 6 and is directed along a path substantially parallel to the projected plane 12 of beam divider 5. The transmitted portion of $R_1$ does not interfere adversely with the present concept and is to be ignored. The transmitted portion of $R_2$ is reflected by surface 9 of plate 7 along a path substantially, but like the path of $R_1$ not completely, parallel to said projected plane 12. The reflected portion of $R_2$ does not interfere adversely with the present concept and is to be ignored.

The reflected rays $R_1$ and $R_2$ are intercepted by a retroreflector 13. A retroreflector is a component possessing the property of reflecting incident radiation such that the angle of deviation is substantially equal to 180° for all angles of incidence within its useful field. Either a right angle prism, front surface mirrors disposed in planes at right angles to each other, or a corner cube prism (triple mirror prism) perform satisfactorily as retroreflectors.

Retroreflector 13 as depicted in FIG. 1 possesses two full reflective surfaces 14 and 15. These surfaces 14 and 15 may represent the reflective surfaces of two mirrors lying fixedly in normal planes but preferably comprise the sides of a right angle prism as shown in FIG. 2. The joinder 16 of surfaces 14 and 15 is termed a joinder axis for purposes of this invention. In the instance where a triple mirror prism is employed as a retroreflector, this joinder axis is a joinder point. When reference herein is made to a joinder axis, it is intended to include a joinder point as applicable.

Rays $R_1$ and $R_2$ are reflected from surfaces 14 and 15 respectively across projected plane 12 of beam divider 5 to be further reflected by surfaces 15 and 14 respectively to surfaces 9 and 8 respectively thence to a common position A on the beam dividing surface 10 of beam divider 5 where the rays combine in optical interference.

It is recognized that refraction of light beams occurs when the beams pass from air to glass and vice versa. For all practical purposes, however, this refraction can be ignored for the purposes of the present invention and will be ignored herein.

Optical interference at position A will occur only when the path lengths of $R_1$ and $R_2$ are equal (in the instance of white light producing the well known zero order fringe), substantially equal (in the instance of white light producing 1st, 2nd, etc., order fringes), or differ by a distance equal to $n\lambda$ (in the instance of monochromatic light), where $n$ equals an integer and lambda ($\lambda$) equals the wavelength of the light. The zero order fringe, as well as its adjacent 1st, 2nd, etc., order fringes, are readily identifable by an observer. All fringes produced by monochromatic light appear identical and no particular one can be identified as possessing distinguishing characteristics.

A second embodiment of the present invention is illustrated in FIG. 2 and comprises a well-known Kosters prism 17 and right angle prism 18. Beam division (at surface 10) and optical interference (at position A on surface 10, as previously described herein, occurs in the Kosters prism and retroreflection is by means of the right angle prism.

The path difference within the optical system depicted in FIG. 1 of the rays combining interferometrically can at all times be described as follows:

$$\text{path difference} = 4D \tan \alpha \qquad (1)$$

where:

D is the lateral displacement of joinder axis 16 from projected plane 12 and, alpha ($\alpha$) is the angle noted in FIG. 1 and hereinbefore described.

There are several possible modes for supplying light incident upon the entrance face 19 of the Kosters prism and which will result in optical interference as seen by an observer looking toward the exist face 20 of the Kosters prism. In the arrangement illustrated in FIG. 3, white light from an extended source is employed. An extended source radiates light at all useful angles simultaneously. Rays of white light enter the Kosters prism at all useful angles, follow paths within the system as hereinbefore described and exit at a multitude of angles beta ($\beta$), one of which is depicted in FIG. 1, corresponding to a multitude of angles alpha ($\alpha$). Therefore, Equation 1 may be stated:

$$\text{path difference} = 4D \tan \beta \qquad (2)$$

where:

beta ($\beta$) is the exis angle corresponding to that angle alpha which will cause two rays to interfere at the beam dividing plane and leave the exist face of the Kosters prism at angle beta, angle beta being measured from the normal to the exit face.

It is the observer's eye which selectively separates the light exiting the Kosters prism since the eye will focus light entering the pupil at different angles onto different parts of the retina. Thus looking normally into the exit face of the Kosters prism and when white light is employed, an observer will always see the well-known zero order fringe characteristic of white light at the center of the observable fringe pattern since that is the position at which the eye focuses normal light (assuming an extended source). To either side of the zero order fringe in the pattern will be observed interference fringes increasing in order away from the central zero order fringe as angle beta is increased creating a slight increase in path difference, assuming D remains constant. FIG. 4 illustrates a typical fringe pattern of this type.

It is noted in FIG. 3 that the joinder axis 16 of the retroreflector 18 is displaced laterally from projected plane 12 by a slight distance D. Since the order of interference, or path difference, is equal to $4D \tan \beta$, a smaller displacement D is required to produce a given interference fringe if a large angle beta is used. It is therefore to the observer's advantage to use the largest angle practicable in order to achieve maximum sensitivity in the instrument. It is obvious from viewing FIG. 2, however, that the fore and aft range of the retroreflector is limited as to the maximum allowable distance between the base 22 of the Kosters prism and the retroreflector. The larger angle beta becomes, the shorter becomes the maximum distance at which the retroreflected light will not completely miss the Kosters prism.

From the foregoing it can be realized that when $D=0$, $4D \tan \beta = 0$ for all angles beta. That is, all rays entering the system travel equal length paths and when employing the extended source of white light, an observer will see a solid zero order fringe over the entire field of view as illustrated in FIG. 5.

When D equals a small number, $4D \tan \beta = 0$ only when beta equals zero, that is when the exit angle beta is normal to the exit face of the Kosters prism. The two rays of the previous discussion herein (see FIG. 2) entering the Kosters prism will be normal to the entrance face of the Kosters prism for beta to equal zero. For rays incident upon the entrance face at angles other than 90°, there are yet possible combinations of $4D \tan \beta$ which will produce orders of interference other than zero. These combinations must satisfy the equation:

$$\text{path difference} = 4D \tan \beta = n\lambda \qquad (3)$$

where:

beta ($\beta$) is some specific angle other than 90° lambda ($\lambda$) is the wavelength of the white light, and n is an integer denoting the order of the interference fringe.

FIG. 6 illustrates an instance where D is some larger value D'. FIG. 7 illustrates the observable fringe pattern. Note the relatively wide spacing between the zero order fringe and each 1st order fringe and the relatively small displacement D of the joinder axis of FIG. 3 as compared to the fringe spacing and displacement D' of FIGS. 7 and 6, respectively. As D increases in value, the observable fringe pattern appears to contract toward the stationary zero order fringe. Thus if an observer's eye remains fixed, the position of the 1st order fringe appears to change as D changes. The zero order fringe does not appear to move. A measure of the change in D can be obtained by measuring the apparent movement of the 1st order fringe as by noting its position relative to a reticle or the like.

In the illustrations presented thus far the appearance of the fringe pattern is identical whether D is measured to the left or right (in the plane of the figures) of the projected plane of the beam divider. FIG. 8 presents a perferred embodiment of a dual retroreflector comprising two right angle prisms stacked one upon the other and cemented in position, their joinder axes being permanently displaced laterally with respect to each other by a small amount S. When this duel retroreflector is substituted for the single retroreflector of FIG. 3, the separated joinder axes being disposed an equal distance from and one on either side of projected plane 12, the observable fringe pattern will be as illustrated in FIG. 10. Movement of the dual retroreflector laterally with respect to plane 12 moves one of the joinder axes closer to the plane and the other joinder axis further from the plane. In effect, this is changing the D value hence angle beta of Equation 2 for each the top prism and for the bottom prism. The net result is that the 1st order fringes of the top and bottom halves of the fringe pattern illustrated in FIG. 10 appear to move in opposite directions (laterally in the plane of FIG. 10). The 1st order fringes in that half (top or bottom) of the fringe pattern corresponding to that half of the retroreflector whose axis is moved away from the plane 12 will appear to move toward the stationary zero order fringe. The 1st order fringes in the other half of the pattern will appear to move away from the stationary zero order fringe as illustrated in FIG. 11. One of the 1st order fringes in the image of the top prism of FIG. 11 has moved out of the field of view. Thus an observer can determine by the apparent movement of the fringes which direction, left or right in the plane of FIG. 10, the retroreflector is moved.

Employing a Kosters prism having a base length of 2 inches and two right angle prisms having individual base lengths of 2 inches and having their joinder axes displaced by about 0.0005 inch, a fore and aft range of about 48 inches has been found possible before the retroreflected radiation completely misses the Kosters prism. When employing white light in this example, displacements of about 10 microinches can be detected and measured. By using a sodium lamp, displacements of about 5 microinches can be detected and measured. These values represent the smallest displacements which can be detected and measured. The largest displacements which be measured depend upon the physical dimensions of the Kosters prism and the retroreflector.

Alignment of the "split" fringes depicted in FIG. 11 can be more accurately accomplished than can estimation of the location of a fringe relative to a reticle or the like, hence the dual retroreflector in this manner provides increased accuracy in making measurements. Further, because both the top and bottom portions of a 1st order fringe move simultaneously and in opposite directions with respect to each other when the dual retroreflector is displaced from plane 12, the sensitivity of the measurement employing a dual retroreflector is twice that when a single retroreflector is employed.

FIG. 12 illustrates a further embodiment of the present invention wherein the source of white light 23 is on the same side of the Kosters prism as the viewer. Source 23 emanates a beam of light to a beam divider external to the Kosters prism 17 and so oriented as to direct a portion of the light beam to the Kosters prism. A collimating lens 25 is provided in the path of the light beam. By design the point source 23 is off the focal point of the lens 25, being a short distance further from lens 25 than the focal point; the observer being a similar distance closer to the lens that the focal point, and, therefore, lens 25 fails to completely collimate the light passing therethrough and to the Kosters prism. It is recalled from Equation 2 that for any specific angle beta there is only one value of D which will produce a selected path difference hence a selected order fringe. In the embodiment of FIG. 12, D is fixed in value and therefore only one specific value of angle beta (90°) will produce the zero order fringe and only one specific value of angle beta will produce 1st order fringes. By tilting, in the plane of FIG. 12, the light source-lens arrangement with respect to the Kosters prism, one can select that value of angle beta which will produce the desired 1st order fringe. The angle for producing the zero order fringe when D does not equal zero is always beta equals zero. In the embodiment depicted in FIG. 12, the zero order fringe does not appear in the observer's field of view.

After reflection within the Kosters prism and retroreflector, combination in optical interference as hereinbefore described, and exiting the Kosters prism, interfering rays pass through lens 25 and beam divider 24 to the observer. As illustrated in FIG. 13 and as seen by the observer, the angle phi ($\phi$) subtended by the lens 25 is much smaller in terms of total number of different directions of rays incident upon the observer's eye than if the lens had not been employed. The result, illustrated in FIG. 14, is a greatly magnified fringe as seen by the observer and increased angular resolution in the field of view.

A sodium lamp emanating substantially monochromatic light may be substituted for white light in the embodiment of FIG. 12. Because of the inability of an observer to distinguish between individual monochromatic fringes by merely observing their physical appearance, the dual retroreflector is employed when monochromatic light is used. Detection and measurement of the displacement of the dual retroreflector is as described hereinbefore.

A further embodiment of the subject invention employing electronic means for detecting movement of the retroreflector joinder axis is illustrated in FIG. 15. In this embodiment, fully collimated light is employed to provide a multiplicity of rays of a selected angle beta which remains fixed. For any value of D equal to $n\lambda$, where $n$ is an integer and lambda is the wavelength of the light employed, and within the range of the device, there will be either darkness or total light arriving at photodetector 26, depending upon whether there occurs constructive or destructive interference. Only a single retroreflector is employed in this latter embodiment.

In the embodiment of FIG. 15, when in an original set-up of the instrument the joinder axis lies in plane 12 and angle beta is selected to produce a path difference resulting in destructive interference of the rays, hence darkness as "seen" by the photodetector, one can detect a change in D, the direction of the change (right or left) and the magnitude of the change by means of tiltable transparent plate 27. Movement of the retroreflector to the right or left of plane 12 moves the retroreflected rays with respect to the Kosters prism. Controlled and measured tilt of plate 27, lying in the paths of the rays and between the Kosters prism and the retroreflector, by means of a micrometer driver means, for example, diverts the rays by refraction back to that position on the Kosters prism which the rays struck when D equalled zero. By calibration the micrometer scale may be made to provide a direct measurement of the tilt of plate 27 required to re-produce a minimum indication by photodetector 26 (total darkness) hence an indirect measurement of the change in D. The direction of the required tilt indicates whether the retroreflector has been displaced to the right or left of plane 12. It is noted that the tiltable plate is common to all rays passing between the Kosters prism and retroreflector and does not introduce any path difference but merely shifts the position of the rays with respect to the Kosters prism. Further, the tiltable plate concept is equally applicable to embodiments employing single or dual retroreflectors. This same detection and measurement method applies if one choses to establish D originally at some specific value of $n\lambda$. Photodetectors may be "zeroed" on total darkness or maximum light.

Referring to FIG. 15, the present device, within its design limits, is sensitive to a single freedom of movement, that being lateral displacement in the plane of the figure. Rotation of the plane of the figure by 90° rotates the direction of sensitivity to movement from lateral displacement in the plane of the figure to displacement in a direction normal to the plane of the figure. Lesser or greater rotation of the instrument allows detection and/or measurement of displacement radially from the axis of rotation at any angle of rotation. It is to be noted that this radial displacement can be detected and/or measured dynamically, such as while the retroreflector is being moved fore or aft.

The present invention provides an excellent means for analyzing the straightness of the ways of a lathe. To accomplish this task, the retroreflector is secured to the lathe slide so as to be movable therewith. The remainder of the interferometer system is mounted, fixedly, on the headstock of the lathe or on some other stationary mount such that light travel can occur between the retroreflector and the Kosters prism. As the lathe slide moves on the ways, the retroreflector moves fore and aft and also laterally if the ways of the lathe are not straight causing the slide to move in a non-straight path. This lateral movement is "seen" by the instrument as displacement (D) of the retroreflector. Through the use of a conventional recorder connected to the output of the photodetector (see FIG. 15), a visual display of the degree of straightness or non-straightness of the lathe ways can be obtained. By rotating the entire instrument 90° (turning it onto its side), and again moving the slide, one can detect the waviness, if any, in the lathe ways.

Whereas the present invention has been disclosed with particularity and reference to specific components and embodiments, there is no intent to restrict the scope of the invention except as limited by the claims appended hereto.

We claim:
1. An interferometer system comprising
at least two transparent reflective members disposed in separate planes converging to an acute angle, a beam divider lying in a plane bisecting said acute angle,
a source of radiation at least a substantial part of which is incident upon one of said reflective members at an acute angle and passes to said beam divider whereupon at least one portion of said radiation is transmitted by said beam divider and at least a separate portion is reflected by said beam divider, said portions being further reflected along non-parallel paths on opposite sides of said beam divider and its projected plane,
a retroreflector having a joinder axis disposed contiguous to said projected plane and receiving said reflected portions of radiation and reflecting the same along separate non-parallel paths to said beam divider whereupon said portions of radiation combine in optical interference to produce an interference pattern comprising at least one elongated narrow fringe not a zero order fringe, said planes of said transparent reflective members diverging toward said retroreflector.

2. The invention of claim 1 wherein said retroreflector comprises at least two right triangular prisms stacked one upon the other with their joinder axes mutually laterally displaced wherein at least two contiguous interference patterns are produced.

3. The interferometer of claim 1 wherein measurement of the proximity of said joinder axis to said projected plane is by means of calibrated movement of a tiltable, transparent plate interposed in the path of radiation passing between said beam divider and said retroreflector.

4. The interferometer system of claim 1 wherein said acute angle formed by the converging reflective members equals 60 degrees.

5. In an interferometer system for detecting and measuring movement normal to the plane of a beam divider, the combination comprising
a beam divider,
transparent entrance reflective means flanking said beam divider on one side thereof and disposed in a plane forming a 30° angle with the plane of said beam divider,
transparent exit reflective means flanking said beam divider on its other side and disposed in a plane forming a like 30° angle with said plane of said beam divider, a movable retroreflector having a joinder axis disposed contiguous to the projected plane of said beam divider, said planes of said entrance and exit reflective means diverging toward said retroreflector,
radiation, divisible into at least two separate rays, passing through said entrance reflective means at an acute angle and incident upon said beam divider, a part of at least one ray being reflected by said beam divider and further reflected to said retroreflector and a part of at least one separate ray being transmitted by said beam divider and reflected along a separate non-parallel path from the aforesaid ray to said retroreflector whereupon both parts are retroreflected along separate non-parallel paths to said beam divider to combine in optical interference and produce a fringe pattern comprising at least one elongated narrow fringe, not a zero order fringe.

6. The interferometer system of claim 5 wherein the relationship between said incident rays and the proximity of said joinder axis to said plane of said beam divider required to produce optical interference may be expressed; path difference of rays within the optical system equals $4D \tan\alpha$, where: D is the distance from the joinder axis to the projected plane measured normally to said plane, and, alpha is the angle formed between the surface of said transparent entrance reflective means and an imaginary line originating at a point on the path of one of said incident rays and proceeding normally therefrom to the point where the second of said rays intersects said entrance reflective means and an imaginary line originating at a point on the path of one of said incident rays and proceeding normally therefrom to the point where the second of said rays intersects said entrance reflective means.

7. In an interferometer system for detecting and measuring movement normal to the projected plane of the beam dividing surface of a Kosters prism, the combination comprising
a Kosters prism having an entrance face and an exit face,
a movable retroreflector spaced from the base of said Kosters prism and having a joinder axis disposed contiguous to the projected plane of the beam dividing surface of said Kosters prism,
radiation comprising at least two separate rays passing through said entrance face of said Kosters prism at an acute angle and incident upon said beam dividing surface, a part of at least one ray being reflected by said beam dividing surface and said entrance face to said retroreflector and a part of at least one ray being transmitted by said beam dividing surface and reflected by said exit face to said retroreflector, said separate parts of rays following separate non-parallel paths from the Kosters prism to the retroreflector, whereupon both parts are retroreflected along separate non-parallel paths to said beam dividing surface to combine in optical interference and produce an interference pattern comprising at least one elongated narrow fringe, not a zero order fringe.

8. The interferometer system of claim 7 wherein the relationship betweenn said incident rays and the proximity of said joinder axis to said projected plane necessary to produce optical interference obeys the expression: path difference of rays within the optical system equals 4D tan alpha, where: D is the distance from the joinder axis to the projected plane measured normally to said plane, and, alpha is the angle formed between said entrance face and an imaginary line originating at a point on the path of one of said incident rays and proceeding normally therefrom to the point where the second of said rays intersects said entrance face.

9. An interferometer system comprising
   a Kosters prism having an interior beam dividing surface and at least first and second converging planar faces,
   a beam divider external to said prism and disposed in a plane forming substantially a 45° angle with the plane of said first face,
   collimating lens means disposed between said external beam divider and said first face and lying in a plane substantially parallel to the plane of said first face,
   point source light means spatially separated from said external beam divider and emanating a beam of light to said external beam divider, said beam being in part reflected through said lens to said Kosters prism and incident upon the first face thereof at an acute angle, separate rays of said light being in part reflected and in part transmitted at the internal beam dividing surface of said prism,
   a retroreflector having a joinder axis disposed contiguous to the projected plane of said internal beam dividing surface receiving said parts of said light and retroreflecting the same along separate non-parallel paths to said internal beam dividing surface whereupon said parts combine in optical interference forming a fringe pattern comprising at least one elongated narrow fringe, not a zero order fringe, and are directed by said internal beam dividing surface out of said prism through said first face thence through said lens, thence through said external beam divider to an observation point being located a distance from said lens equal to its focal length, said planar faces of said Kosters prism diverging toward said retroreflector.

10. The interferometer of claim 8 wherein the distance from said point source to said lens is greater than the focal length of said lens such that said lens fails to completely collimate the light passing therethrough, providing light of a small range of angles to said Kosters prism, said light source-external beam divider-lens system being tilted with respect to the face of said prism to cause light to enter said prism at a desired angle.

References Cited

German printed application, 1,009,185, Feb. 9, 1961, KY 42b, 12/1905, Leitz et al.

JEWELL H. PEDERSEN, *Primary Examiner.*

BERNARD LACOMIS, *Assistant Examiner.*

U.S. Cl. X.R.

350—173, 174, 286, 299